C. J. JONES.
WATER ELEVATOR.
APPLICATION FILED AUG. 3, 1917.
1,290,754.
Patented Jan. 7, 1919.
5 SHEETS—SHEET 3.
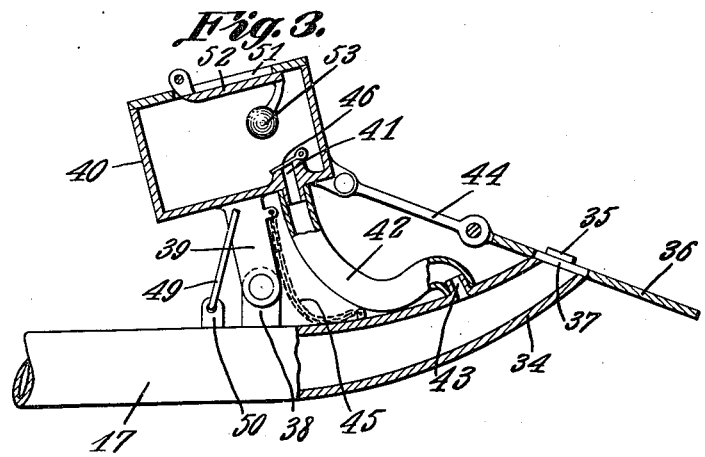
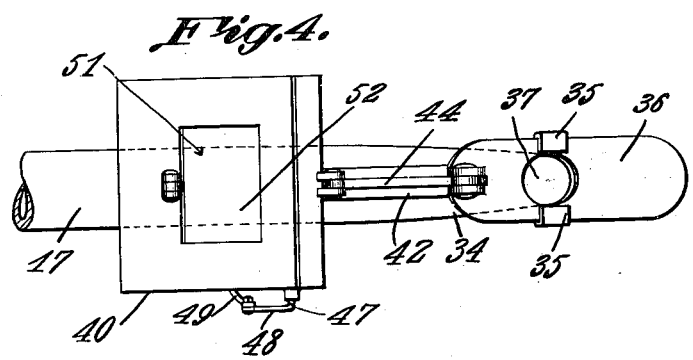
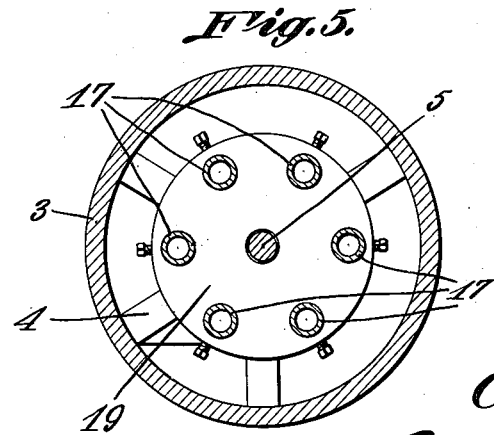
C. J. Jones, Inventor
by C. A. Snow & Co.
Attorneys
Witnesses C. J. JONES.
WATER ELEVATOR.
APPLICATION FILED AUG. 3, 1917.
1,290,754.
Patented Jan. 7, 1919.
5 SHEETS—SHEET 4.
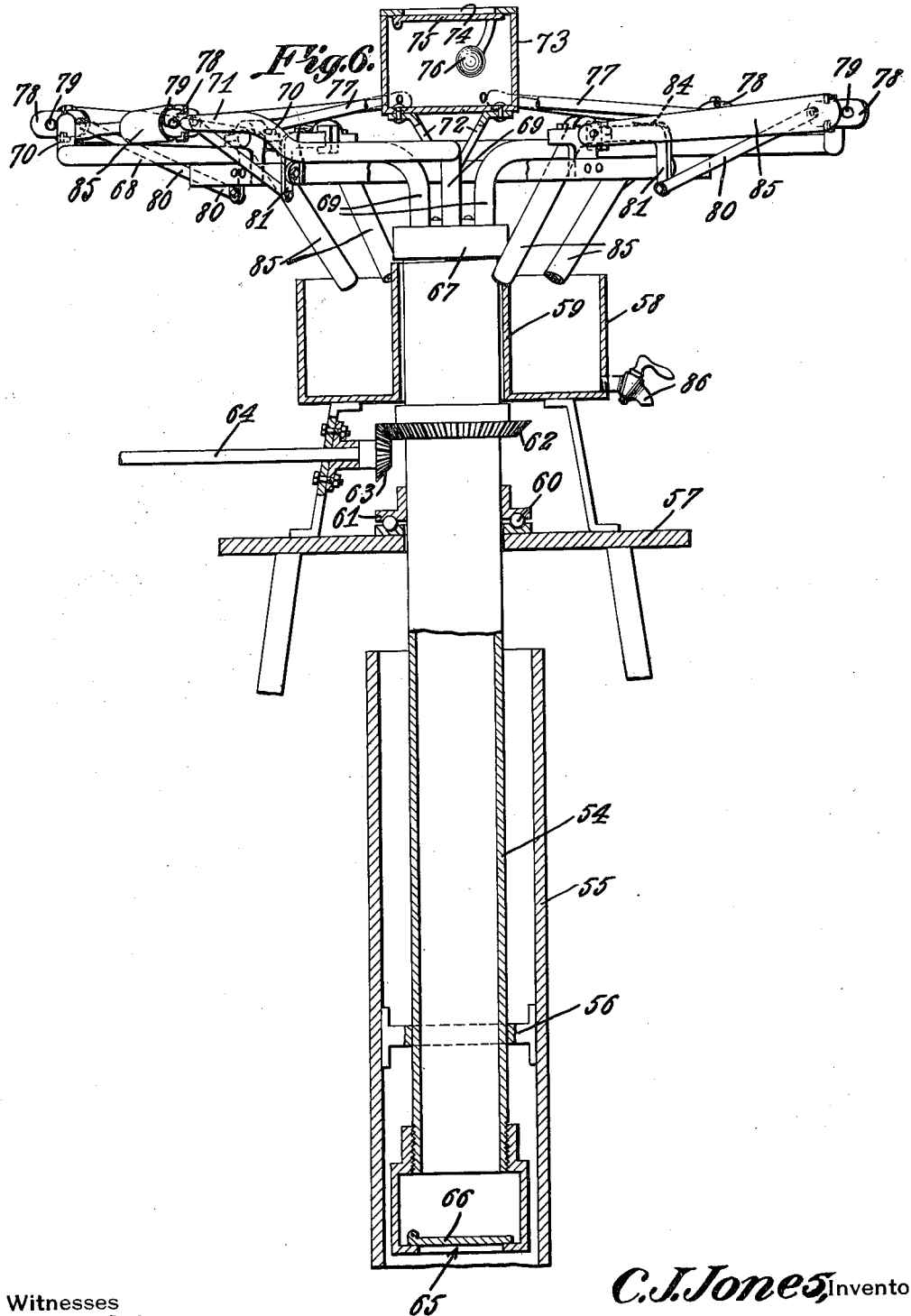
Witnesses
C. J. Jones, Inventor
by C. A. Snow & Co.
Attorneys

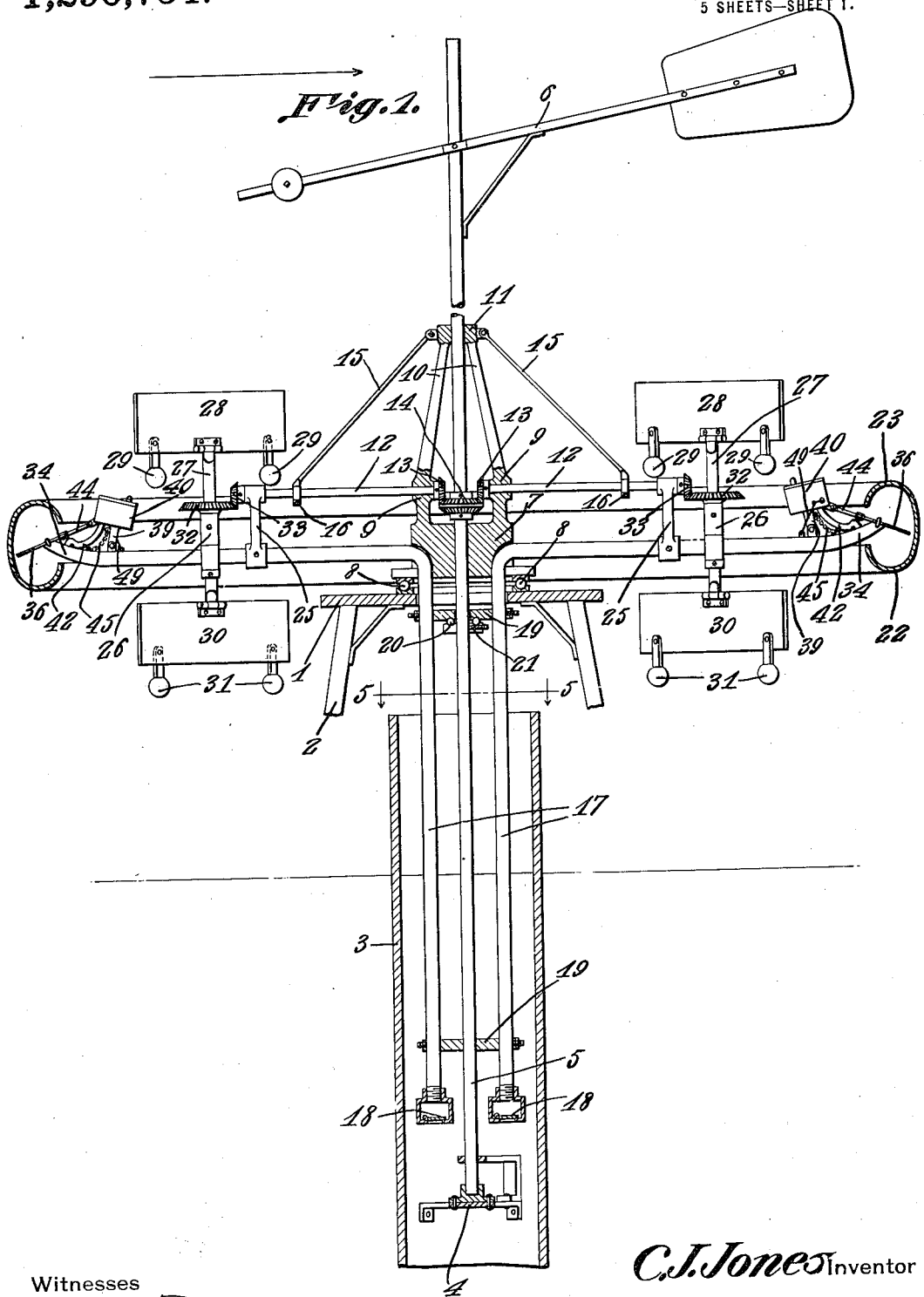

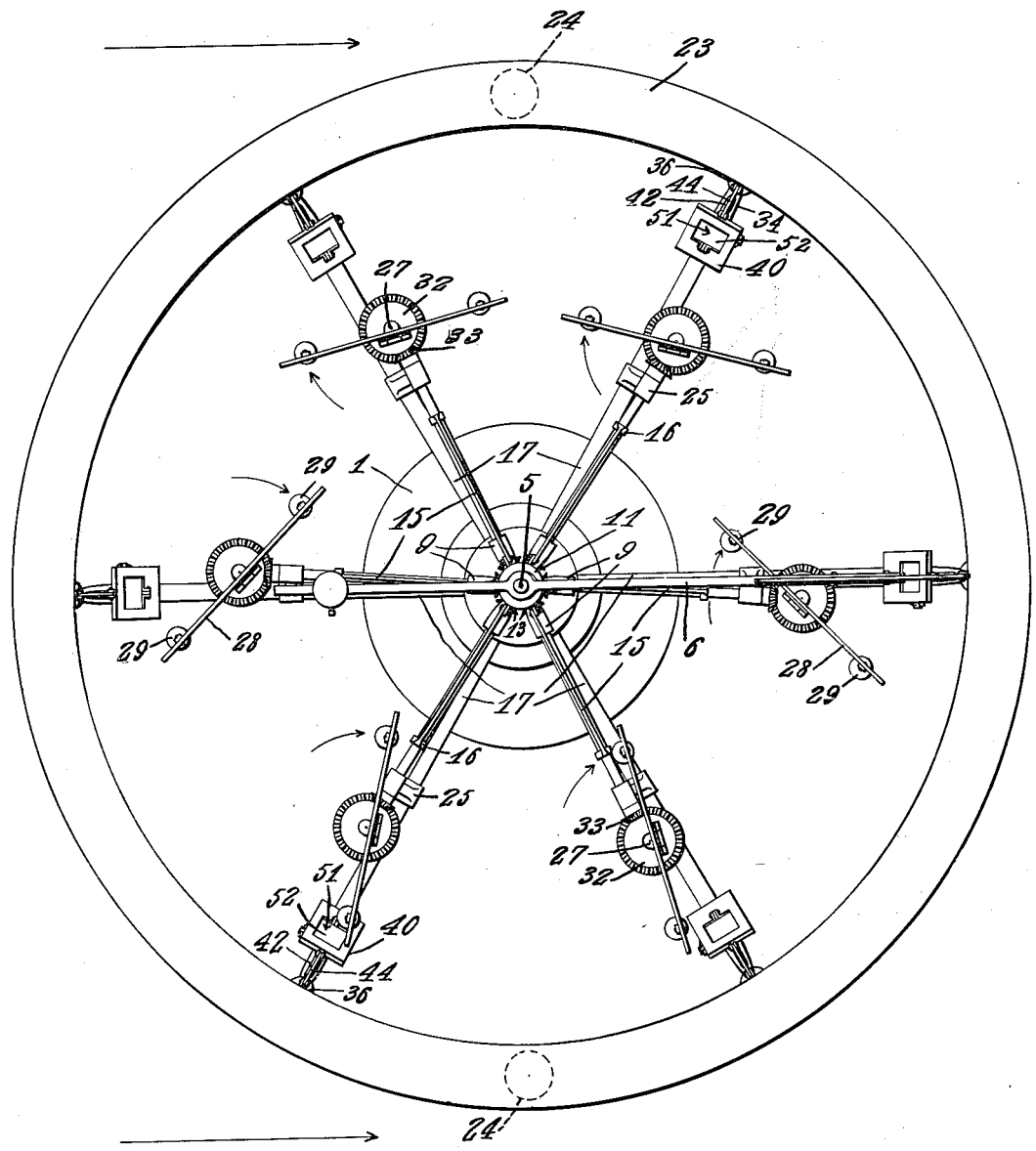

C. J. JONES.
WATER ELEVATOR.
APPLICATION FILED AUG. 3, 1917.

1,290,754.

Patented Jan. 7, 1919.
5 SHEETS—SHEET 5.

Witnesses

C. J. Jones, Inventor
by C. A. Snow & Co.
Attorneys

UNITED STATES PATENT OFFICE.

CHARLES J. JONES, OF SAN ANTONIO, TEXAS.

WATER-ELEVATOR.

1,290,754. Specification of Letters Patent. Patented Jan. 7, 1919.

Application filed August 3, 1917. Serial No. 184,234.

*To all whom it may concern:*

Be it known that I, CHARLES J. JONES, a citizen of the United States, residing at San Antonio, in the county of Bexar and State of Texas, have invented a new and useful Water-Elevator, of which the following is a specification.

This invention relates to apparatus for hoisting water and is more especially designed for irrigation purposes, one of the objects of the invention being to provide a novel form of mechanism operated by wind power and which, when in motion, sets up a centrifugal action which results in the elevation of the water and its distribution to a collecting means.

A further object is to provide improved means whereby the apparatus is kept primed so that when the mechanism begins to operate the hoisting of the water will start immediately.

With the foregoing and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawings the preferred form of the invention has been shown.

In said drawings:

Figure 1 is a central vertical section through the apparatus, the parts being shown in the positions assumed thereby during the operation of the mechanism.

Fig. 2 is a plan view.

Fig. 3 is an enlarged section through the discharge end portion of one of the delivering nozzles, and showing the relative positions of the parts during the discharge of water.

Fig. 4 is a plan view of the structure shown in Fig. 3.

Fig. 5 is a section on line 5—5 Fig. 1.

Fig. 6 is a view similar to Fig. 1 but showing another form of apparatus adapted to be driven by a motor.

Figure 7:
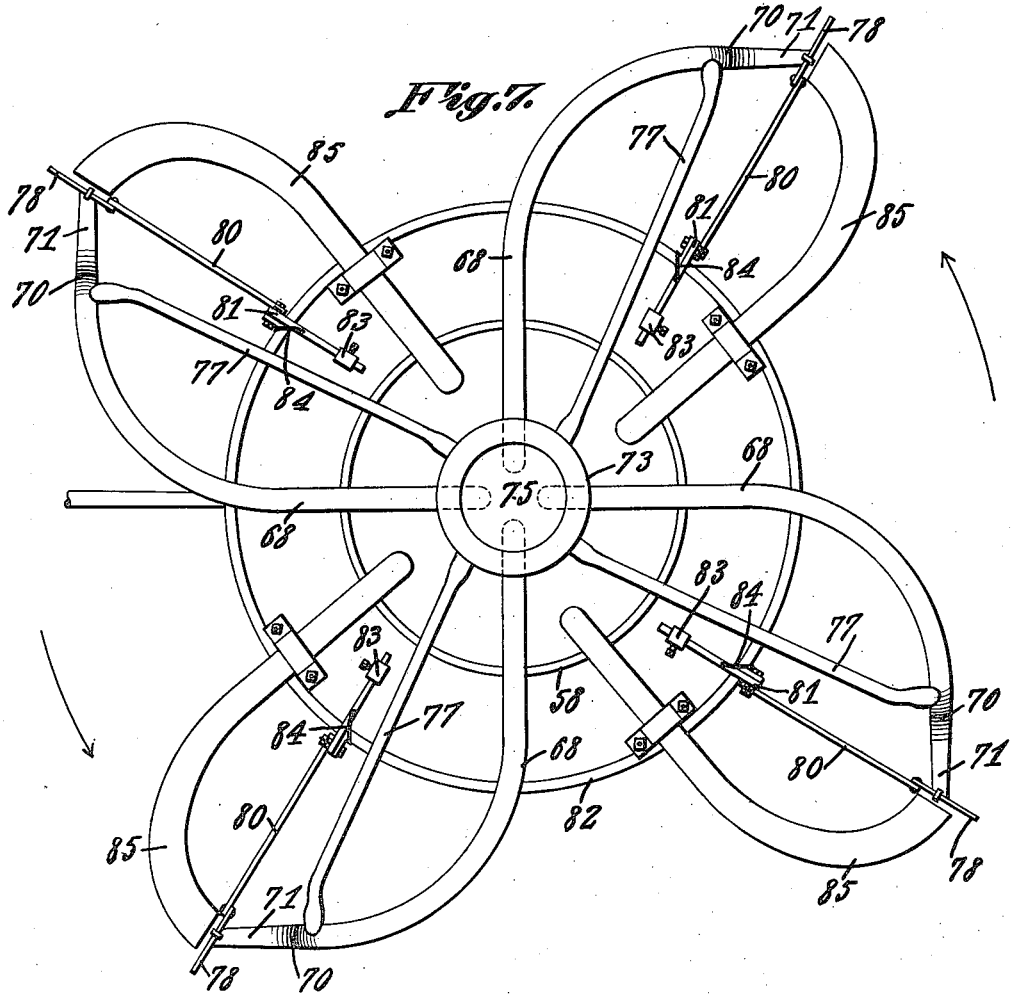
Fig. 7 is a plan view of the structure shown in Fig. 6.

Referring to the figures by characters of reference, 1 designates a table which may be mounted on a suitable supporting structure 2 erected over a well 3 or any body of water from which the elevation is to take place. In the present instance a portion of a well is shown. Under any condition a base bearing 4 is provided for engagement by the lower end of a vertical shaft 5 which extends upwardly through the table 1 and is provided, at its upper end with a weather vane 6 which serves to hold the shaft 5 against rotation under normal conditions unless there is a variation in the direction of the wind.

Mounted to rotate upon the table 1 is a cap 7 preferably provided with anti-friction devices 8 so that the rotation can take place freely. This cap rotates freely on the shaft 5 and has upstanding bearings 9 which may be connected, if desired, by arms 10 to another bearing 11 through which the shaft 5 extends. In each of the bearings 9 is journaled a radial shaft 12 and any desired number of these shafts may be employed. In the present instance six of them are used. The inner end of each shaft has a gear 13 which meshes with and is adapted to roll upon another gear 14 which is secured to and rotates with the shaft 5. Brace rods 15 are extended downwardly and outwardly from the bearing 11 and are provided at their lower ends with bearings 16 in which the shafts 12 are journaled.

Arranged parallel with the shaft and extending downwardly from the cap 7 to points below the body of water supplying the apparatus are pipes 17 each provided at its lower end with a check valve 18 which allows water to rise freely into the pipe but prevents it from flowing downwardly therefrom. The several pipes 17 are connected together by any suitable means such as disks 19 which are mounted for rotation on the shaft 5. one or more of these disks being provided with anti-friction bearings 20 interposed between the disk and a collar 21 fixed upon the shaft 5. The supplemental friction bearings 20 thus assist the bearings 8 in supporting the weight of the working portion of the apparatus.

The upper ends of the pipes 17 are extended radially from the cap 7 and there are preferably six of these radial pipes used where six shafts 12 are employed as in the present instance. Obviously, however, the number of the shafts 12 and, consequently, the number of pipes 17 can be increased or reduced as desired thus to increase or reduce the capacity of the apparatus.

The outer end of each of the radially extended portions of the pipes 17 is curved upwardly and tapered and projects into a circular trough 22 which has an overhanging portion 23. This trough may be provided with one or more outlets 24 whereby water elevated thereto can be distributed to the points of use.

Mounted on the radially extending portions of the pipes 17 are bearings 25 in which are journaled the outer end portions of the shafts 12. Additional bearing members 26 are mounted on these portions of the pipes 17 and journaled in each of these bearings 26 is a vertical shaft 27. To the upper end of each of these shafts 27 is hingedly connected a blade 28 having weights 29 extending downwardly therefrom so as to hold the blade normally vertical. Another blade 30 is hingedly connected at its upper edge to the lower end of each shaft 27 and has weights 31 depending therefrom for holding the blade normally vertical. Each shaft 27 has a gear 32 secured thereto and constantly meshing with another gear 33 secured to the outer end of one of the shafts 12. The gears are so located and proportioned that when the cap 7, shafts 12 and radial portions of the pipes 17 are rotating about the shaft 5, the gears 13, by rolling on the gear 14, will cause shafts 12 to rotate and transmit motion through gears 33 and 32 to the shafts 27. This will result in the blades 28 and 30 being brought successively into position to receive the force of the wind, and to feather during their return movement. The relative positions of the blades relative to the direction of the wind have been indicated in Fig. 2, large arrows being employed to show the direction of the wind. With this arrangement of blades and operating means therefor the greater number of all of the blades are constantly active to transfer the force of the wind to the rotating mechanism thereby to continuously operate said mechanism.

For the purpose of keeping the tapered nozzles 34 of the pipes 17 properly primed and for the purpose of controlling the discharge of water through the nozzles, a novel valve mechanism such as illustrated in Figs. 3 and 4, is utilized. By referring to these figures it will be noted that the nozzle has opposed guides 35 projecting from the sides thereof and slidably mounted on the end of the nozzle and held thereto by the guides is a valve plate 36 having an opening 37 therein. Under some conditions this opening registers with the opening in the end of the nozzle, but when the machine is at rest the opening is out of register with the nozzle and a portion of the valve 36 closes the nozzle.

A bracket 38 is arranged on the nozzle back from the outlet opening thereof and pivotally mounted on this bracket is an arm 39 supporting a tank 40. This tank has an outlet opening 41 in the bottom thereof which is connected, by a flexible tube 42, to a port 43 in the top of the nozzle 34 close to the outlet thereof. A rod 44 is pivotally connected to the tank and to the valve plate 36 and the ports are so proportioned that when the tank 40 is tilted back away from the nozzle 34 the outer end portion of the plate 36 will close the nozzle whereas when the tank is moved outwardly toward the discharge end of the nozzle the opening 37 in valve plate 36 will register with the discharge end of the nozzle.

A chain 45 or other flexible connection is employed for limiting the tilting movement of the tank 40 away from the nozzle 34. The outlet 41 of the tank has a valve 46 for closing it. This valve is connected to a transverse shaft 47 provided with a crank arm 48. A rod 49 is pivotally connected to the crank arm and to an ear 50 on the pipe 17. Thus when the tank 40 is swung inwardly away from the nozzle 34 the rod 49 will push upwardly on the crank arm 48 and open the valve 46 whereas when the tank is swung outwardly toward the discharge end of the nozzle, and as shown in Fig. 3, the rod 49 will pull on the crank arm 48 and close valve 46 and at the same time stop the outward swinging movement of the tank.

Each tank 40 has an inlet opening 51 in the top thereof adapted to be closed by a valve 52 and a float 53 is connected to the valve and is arranged within the tank so as to close the valve when the tank is filled and prevent overflow.

Assuming that the apparatus is at rest, all of the pipes 17 are filled with water and the tanks 40 are likewise filed. Under these conditions the tanks 40 are inclined inwardly so as to hold the valve plates 36 in closed positions and to maintain the tanks 40 in communication with the nozzles 34 through the flexible pipes 42. As soon as the apparatus is rotated by the action of the wind on the blades 28 and 30 the water contained in the radial portions of the pipes 17 will tend to flow outwardly by centrifugal force but will be restrained by the valve plates 36. However, as soon as the centrifugal force is sufficient to swing the tanks 40 outwardly about their pivotal connections with the brackets 38, the plates 36 will be moved downwardly to open the nozzles and the valves 46 will be closed. Thus the water in the tanks 40 will be prevented from escaping downwardly while the water in the pipes 17 will be thrown outwardly by centrifugal force into the circular trough 22. The centrifugal action will be sufficient to elevate water into the vertical portions of the pipes 17 past the valves 18. As soon as the rotation of the apparatus slackens or stops valves 18 will close under the weight of the water in the pipes and by reason of their own weight while, at the same time, the tanks 40 will settle inwardly and close the nozzles and open communication between the tanks 40 and said nozzles, thereby to maintain the apparatus fully primed.

By hingedly mounting the blades 28 and 30 and providing them with weights, they will be free to swing into the wind should they be subjected to wind of excessive velocity. Thus injury to the machine as a result of high wind, is prevented.

Figure 8:
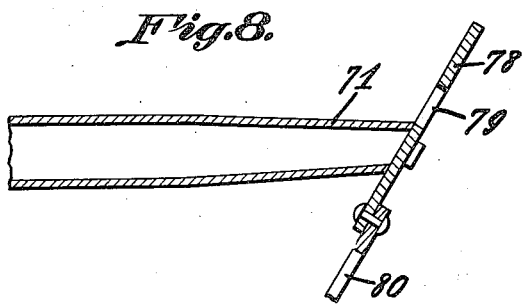
Fig. 8 is a detail view of the discharge end of one of the arms and the mechanism coöperating therewith.

In Figs. 6, 7 and 8 another form of apparatus has been illustrated. This structure is designed primarily to be rotated at a high speed by a motor and embodies certain features of construction differing somewhat from those shown in Fig. 1 to 5 inclusive although embodying the same principles of operation.

By referring to said Figs. 6, 7 and 8 it will be noted that a single large pipe 54 is extended downwardly into the well 55 or other source of water supply, this pipe being journaled for rotation in a bearing 56 and also in a supporting structure 57. A circular tank 58 is suitably mounted on the structure 57 and has a central tube 59 extending therethrough, this tube constituting an additional bearing for the pipe 54. It also prevents the contents of the tank from flowing downwardly through the central opening therein. Suitable ball bearings or other antifriction devices indicated generally at 60 may be mounted on the structure 57, the same being engaged by an annular flange 61 secured about the pipe 54. Thus the pipe is supported against downward movement although capable of rotating freely. A beveled gear 62 is connected to the pipe 54 below the tank 58 and is adapted to receive motion through another gear 63 from a shaft 64 driven by a motor, not shown.

The lower end of the pipe 54 has a water inlet 65 normally closed by a valve 66, this valve operating to prevent the downward escape of water from the pipe 54. The upper end of the pipe is closed by a cap 67 and extending from and opening through this cap is a series of preferably four outlet pipes 68. These pipes are regularly spaced and each is curved upwardly and outwardly as at 69 and then extended radially for a desired distance after which it is curved substantially horizontally in a direction opposite to that in which the apparatus rotates. The free end portion of each of these pipes is inclined upwardly as at 70 and terminates in a horizontal nozzle 71.

The cap 67 has a supporting structure 72 on which is mounted a priming tank 73, this tank having an opening 74 in the top thereof and which opening is adapted to be closed by a valve 75 to which a float 76 is connected as shown in Fig. 6. Extending from the bottom of tank 73 to the inclined portions 70 of the arms 68 are tubes 77 constituting means for supplying water to the pipes 68, thereby to keep the pump primed.

Slidably mounted upon the discharge end of each nozzle 71 is a valve 78 having an opening 79. This valve is connected by a link 80 to one arm of a lever 81 which is fulcrumed on a supporting structure connected to the cap 67 and which structure has been indicated at 82. This lever works in a vertical plane and its upper arm is extended inwardly and is provided with an adjustable weight 83. The weight serves to hold valves 78 normally in position to close its nozzle 71 but, when the apparatus rotates at more than a predetermined speed, the weights 83 will be thrown outwardly by centrifugal force, thereby causing their levers 81 to pull on the valves 78 and bring the openings 79 into register with the nozzles. A spring 84 bears downwardly on each of the levers 81 and serves to hold said levers normally in position to maintain the valves closed.

Supported back of each valve 78 is a delivery spout 85 adapted to receive the water discharged from the adjacent nozzle. These spouts are arranged so as to direct inwardly to the tank 58 all water discharged into them. Obviously while the apparatus is rotating to deliver water by centrifugal force from the nozzles, this water will be directed into the spouts 85 and the pressure of air received in the advancing ends of the spouts will be sufficient to force the water from said spouts into the tank. Said tank may have a suitable outlet 86 from which the accumulated water can be drawn.

When the rotation of the apparatus is slackened the weights 83 will close the nozzles by shifting the valves 78 and a portion of the water contained in the tank 73 will flow through the pipes 77 into the pipes 68 thereby to fill up any spaces and keep the apparatus primed. During the first portion of the rotation of the apparatus, while the valves are closed, water will be forced outwardly against the closed valves by centrifugal force and be directed upwardly through the tubes or pipes 77 into the tank 73 which will thus be filled. Overflow of the tank will be prevented by the float controlled valve 75.

What is claimed is:—

1. Water elevating apparatus comprising a horizontally revoluble structure including a vertical pipe having a radial portion terminating in a nozzle, means adjacent the nozzle for receiving water discharged from the nozzle, a slide valve normally closing one end of the nozzle and shiftable to open position by centrifugal force, a priming tank revoluble with said structure, and a tube extending from the nozzle and above the radial pipe to the priming tank for conducting surplus water to said tank during the operation of the apparatus and for priming the nozzle when the apparatus is at rest.

2. Water elevating apparatus including a vertical pipe having a radial portion terminating in a nozzle pointed oppositely to the direction of rotation, a stationary tank, means for receiving liquid discharged from the nozzle and directing it to the tank, said means being revoluble with the nozzle, and centrifugally operated means for controlling the discharge of water from the nozzle.

3. Water elevating apparatus including a horizontally revoluble structure having a vertical pipe provided with radial portions terminating in elevated nozzles, said nozzles being pointed oppositely to the direction of rotation, a stationary tank, rearwardly and inwardly curved spouts revoluble with and adapted to receive water from the nozzles and direct it inwardly to the tank, and centrifugally operated valves for controlling the discharge of water from the nozzles.

In testimony that I claim the foreging as my own, I have hereto affixed my signature in the presence of two witnesses.

CHARLES J. JONES.

Witnesses:
 Louis Y. Saunders,
 Julia Berliski.